(12) United States Patent
Lee

(10) Patent No.: US 11,484,393 B2
(45) Date of Patent: Nov. 1, 2022

(54) FORCEPS FOR REMOVING DENTAL IMPLANT FIXTURE

(71) Applicant: Jin-Kyun Lee, Seoul (KR)

(72) Inventor: Jin-Kyun Lee, Seoul (KR)

( * ) Notice: Subject to any disclaimer, the term of this patent is extended or adjusted under 35 U.S.C. 154(b) by 338 days.

(21) Appl. No.: 16/566,936

(22) Filed: Sep. 11, 2019

(65) Prior Publication Data

US 2020/0085545 A1 Mar. 19, 2020

(30) Foreign Application Priority Data

Sep. 14, 2018 (KR) .......................... 10-2018-0110404

(51) Int. Cl.
  *A61C 8/00* (2006.01)
  *A61C 3/16* (2006.01)
  *A61C 3/14* (2006.01)

(52) U.S. Cl.
  CPC .............. *A61C 8/0089* (2013.01); *A61C 3/16* (2013.01); *A61C 3/14* (2013.01)

(58) Field of Classification Search
  CPC ............ A61C 8/0089; A61C 3/16; A61C 3/14
  See application file for complete search history.

(56) References Cited

U.S. PATENT DOCUMENTS

2006/0235466 A1* 10/2006 McGarity ............ A61B 17/282
606/205

FOREIGN PATENT DOCUMENTS

| GB | 523804 | 7/1940 | |
|----|--------|--------|---|
| JP | 59-188413 | 12/1984 | |
| JP | 10-216151 | 8/1998 | |
| JP | 3486776 | 1/2004 | |
| JP | 3532230 | 5/2004 | |
| KR | 1988-0003174 | 12/1986 | |
| KR | 10-2005-0097169 | 10/2005 | |
| KR | 10-1309417 | 9/2013 | |
| KR | 101309417 B1 * | 9/2013 | ............... A61C 3/14 |
| KR | 10-2017-0034777 | 3/2017 | |
| WO | 2013/141627 | 9/2013 | |

OTHER PUBLICATIONS

EPO, Extended European Search Report of the corresponding European Patent Application No. 19197159.7. dated Dec. 19, 2019.

* cited by examiner

*Primary Examiner* — Nicholas D Lucchesi
(74) *Attorney, Agent, or Firm* — Lex IP Meister, PLLC

(57) ABSTRACT

An object of the present invention is to provide forceps for removing a dental implant fixture, in which pinching portions securely hold a fixture to remove the fixture implanted in an alveolar bone, and thus to prevent the pinching portions from slipping out of the fixture. Forceps for removing a dental implant fixture according to the exemplary embodiment of the present invention include: a pair of handles; coupling portions extended from the handles, crossed, and hingedly coupled; pinching portions connected to the coupling portions; and holding pieces protruding from ends of the pinching portions in a direction toward a center of a dental implant fixture and each having an arc corresponding to at least a part of an outer circumference of the fixture so that the holding pieces are inserted into a trough of a threaded portion formed on the outer circumference of the fixture.

11 Claims, 15 Drawing Sheets

FORCEPS FOR REMOVING DENTAL IMPLANT FIXTURE

CROSS-REFERENCE TO RELATED APPLICATION

This application claims priority to and the benefit of Korean Patent Application No. 10-2018-0110404 filed in the Korean Intellectual Property Office on Sep. 14, 2018, the entire contents of which are incorporated herein by reference.

BACKGROUND OF THE INVENTION

(a) Field of the Invention

The present invention relates to forceps for removing a dental implant fixture, and more particularly, to forceps for removing a dental implant fixture, which are configured to remove a fixture implanted in an alveolar bone to replace the implant fixture implanted in the alveolar bone.

(b) Description of the Related Art

For example, artificial teeth are used when natural teeth are damaged or lost due to various reasons. The artificial teeth are made to be similar or identical in external shapes and functions as natural teeth. There are methods that implant the artificial teeth as prosthetic parts, dentures, or in alveolar bones.

The prosthetic parts and the dentures cause a lot of inconvenience in use. In contrast, the artificial tooth made designed to be implanted in the alveolar bone does not cause damage to the peripheral teeth and is excellent in external shapes and functions thereof after being completely implanted compared to the prosthetic parts and the dentures.

The lifespan of the artificial tooth implanted in the alveolar bone depends on the implantation and management state, so that the use of the artificial tooth tends to increase. An implant unit is used to implant the artificial tooth in the alveolar bone.

For example, the implant unit includes a fixture configured to be implanted in an alveolar bone, an abutment coupled to the fixture, and a crown installed on the abutment. If the fixture is damaged due to defective management and various reasons such as food waste, and tartar, the implant unit needs to be removed, and a fixture needs to be implanted. During this procedure, a process of removing the fixture implanted in the alveolar bone and integrated with the alveolar bone is performed.

In this case, because forceps for removing the fixture have not been appropriately developed, dental forceps for removing teeth are used. However, the forceps for removing teeth have holding portions in which each portion has an inner surface corresponding to an external shape of a natural tooth.

That is, the natural tooth is structured (undercut) to have a width which is large at an upper end thereof and decreases toward the alveolar bone. Therefore, the inner surfaces of the holding portions have multiple troughs and multiple crests formed in a direction in which the tooth is removed, and inner surfaces of a pair of tip portions facing each other has an interval therebetween that gradually increases from the ends of the holding portions to handles.

When grasping power is applied to the handles of the forceps, the inner surfaces of the tip portions having the troughs, the crests, and the increasing interval apply force to pull out the tooth from the alveolar bone by using the undercut of the tooth, that is, to assist in removing the tooth. However, unlike the natural tooth, the fixture has a thread formed circumferentially on an outer circumferential surface of the fixture.

For this reason, by removing the fixture by using the forceps for removing teeth, when the grasping power is applied to the handles to remove the fixture, the holding portions slip out of the fixture because frictional force between the fixture and the inner surfaces of the holding portions is insufficient.

Meanwhile, a removal kit for removing a fixture is used. However, because the removal kit is expensive and disposable, it is difficult to widely use the removal kit.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide forceps for removing a dental implant fixture, in which pinching portions securely hold a fixture to remove the fixture implanted in an alveolar bone, and thus to prevent the pinching portions from slipping out of the fixture.

An exemplary embodiment of the present invention provides forceps for removing a dental implant fixture, the forceps including: a pair of handles; coupling portions extended from the handles, crossed, and hingedly coupled; pinching portions connected to the coupling portions; and holding pieces protruding from ends of the pinching portions in a direction toward a center of a dental implant fixture and each having an arc corresponding to at least a part of an outer circumference of the fixture so that the holding pieces are inserted into a trough of a threaded portion formed on the outer circumference of the fixture.

The pinching portion may have a groove at an end of thereof, the groove may start with an arc corresponding to the holding piece and may gradually decrease toward the coupling portion, and the groove may receive an upper end of the fixture.

The holding piece may have a thickness t smaller than a thread interval of the threaded portion.

The holding piece may protrude to have a width W larger than a height H of the thread.

The threaded portion may have a quadrangular thread or a trapezoidal thread, and an upper surface and an inner surface of the holding piece may have a cross section formed with a right angle.

Each of the pinching portions may have the single holding piece that defines an arc.

The holding piece may have an inclination angle θ1 set in a diameter direction of the fixture so as to correspond to an inclination of the threaded portion.

The holding piece may have an inclined surface having an inclination angle θ2 set in a diameter direction of the fixture.

The holding piece may have an inclination angle θ3 and an upwardly convex inclined surface set in a diameter direction of the fixture.

The holding piece may have an inclination angle θ4 and an upwardly concave inclined surface set in a diameter direction of the fixture.

Each of the pinching portions may have the multiple holding pieces disposed along an imaginary arc.

Each of the multiple holding pieces may have an inclination angle θ5 set in a diameter direction of the fixture so as to correspond to an inclination of the threaded portion.

As described above, in the exemplary embodiment of the present invention, the holding pieces of the pinching portions hold the thread and the trough of the threaded portion formed circumferentially on the outer circumference of the dental implant fixture, and as a result, the holding pieces of the pinching portions may securely hold the fixture at the time of removing the fixture implanted in the alveolar bone. Therefore, it is possible to effectively prevent the holding pieces from slipping out of the fixture at the time of removing the fixture.

DETAILED DESCRIPTION OF THE EMBODIMENTS

Figure 1:
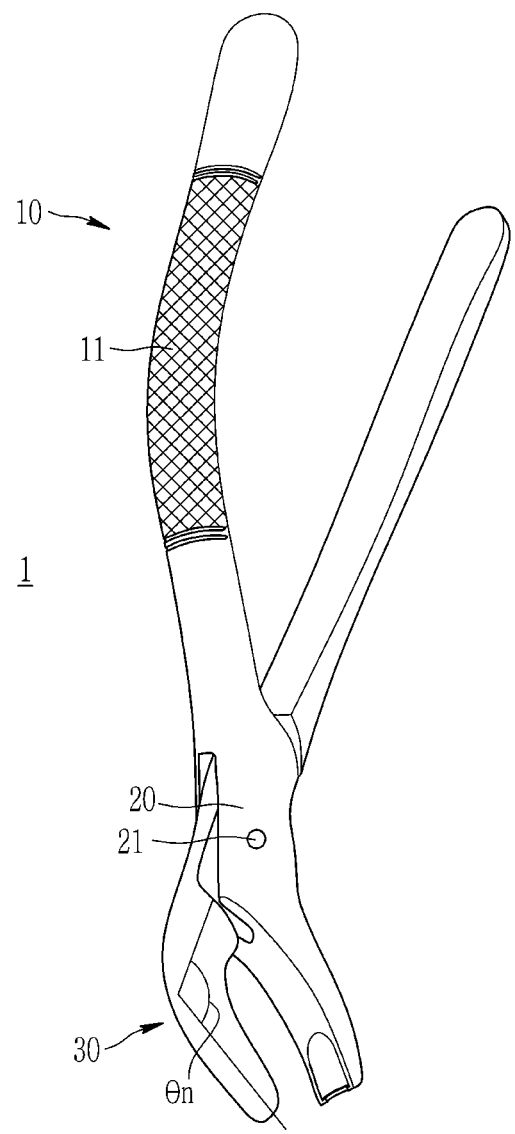
FIG. 1 is a perspective view illustrating forceps for removing a dental implant fixture according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the scope of the present invention. The drawings and description are to be regarded as illustrative in nature and not restrictive. Like reference numerals designate like elements throughout the specification.

Figure 2:
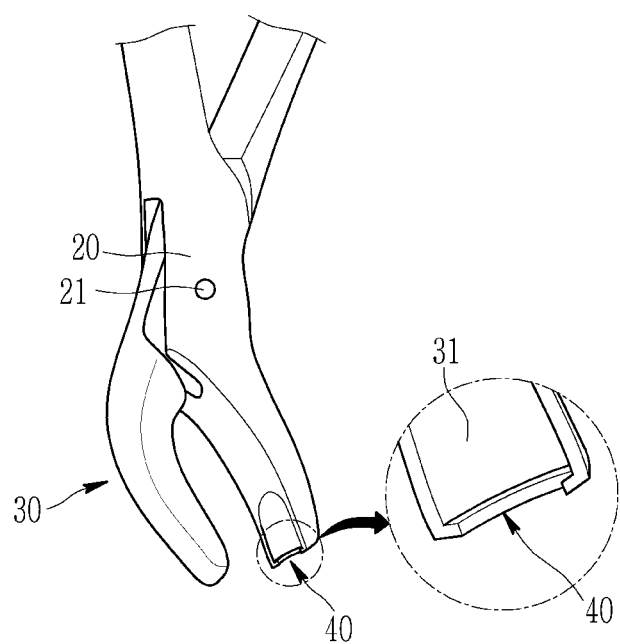
FIG. 2 is a partial perspective view illustrating a pinching portion in FIG. 1.
Figure 3:
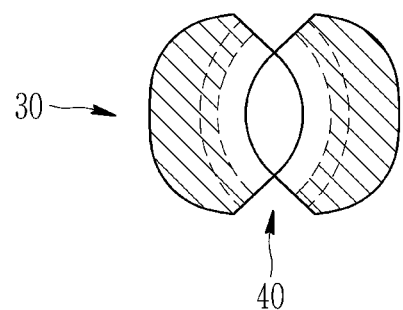
FIG. 3 is a bottom plan view illustrating the pinching portion.

FIG. 1 is a perspective view illustrating forceps for removing a dental implant fixture according to a first exemplary embodiment of the present invention, FIG. 2 is a partial perspective view illustrating a pinching portion in FIG. 1, and FIG. 3 is a bottom plan view illustrating the pinching portion.

Referring to FIGS. 1 to 3, forceps 1 for removing a dental implant fixture according to a first exemplary embodiment include handles 10, coupling portions 20, pinching portions 30, and holding pieces 40.

When a fixture is damaged due to food waste and tartar, a crown and an abutment of an implant unit are removed, and the fixture is exposed from the alveolar bone. The forceps 1 according to the first exemplary embodiment are used to remove the exposed fixture.

In the forceps 1 for removing a fixture, the handles 10 are held by a practitioner's hand to provide grasping power for removing the fixture, and each of the handle 10 has a knurled portion 11 that prevents the practitioner's hand from slipping.

The coupling portions 20 extend from the pairs of handles 10 and are crossed and coupled to each other by a hinge 21. The pinching portions 30 and the handles 10 are crossed and coupled to each other by the coupling portions 20. When the practitioner applies grasping power to the handles 10, the pinching portions 30 hold the fixture through the holding pieces 40.

Figure 4:
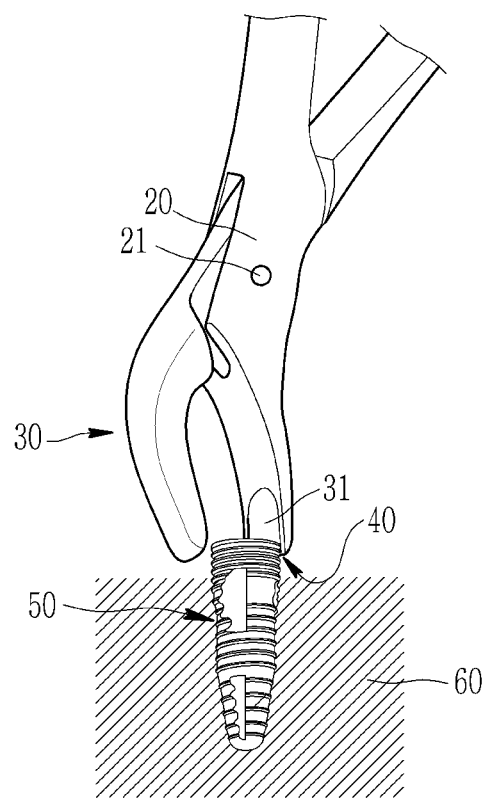
FIG. 4 is a partial perspective view illustrating a state in which a fixture is held by a holding piece of the forceps for removing a dental implant fixture in FIG.
Figure 5:
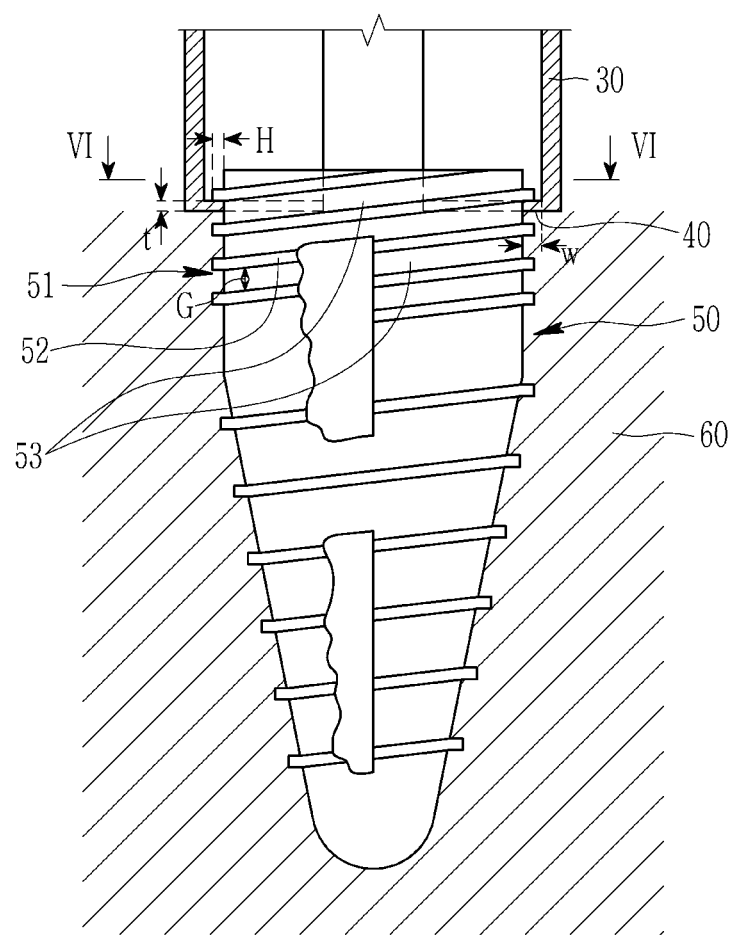
FIG. 5 is a partial cross-sectional view illustrating a state in which a fixture implanted in an alveolar bone is held by the holding piece of the forceps for removing a dental implant fixture in FIG. 1.
Figure 6:
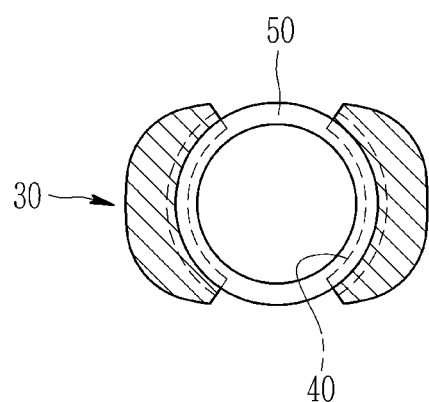
FIG. 6 is a partial cross-sectional view taken along line VI-VI in FIG. 5.

FIG. 4 is a partial perspective view illustrating a state in which a fixture is held by a holding piece of the forceps for removing a dental implant fixture in FIG. 1, FIG. 5 is a partial cross-sectional view illustrating a state in which a fixture implanted in an alveolar bone is held by the holding piece of the forceps for removing a dental implant fixture in FIG. 1, and FIG. 6 is a partial cross-sectional view taken along line VI-VI in FIG. 5.

Referring to FIGS. 4 to 6, the holding pieces 40 protrude from ends of the pinching portions 30 in a direction toward a center of a dental implant fixture 50 and are formed to be inserted into a trough 53 of a threaded portion 51 formed on an outer circumference of the fixture 50 implanted in an alveolar bone 60, thereby holding the fixture 50. As an example, the holding piece 40 has an arc corresponding to at least a part of the outer circumference of the fixture.

The pinching portion 30 has a neck angle θn in a state in which the pinching portion 30 is connected to the coupling portion 20. The neck angle θn may be an angle between a straight direction of the coupling portion 20 and a direction bent from the straight direction, and the neck angle may be equally applied to various dental forceps for removing teeth. A specific description of the neck angle will be omitted.

Referring back to FIGS. 1 and 2, the pinching portion 30 has a groove 31 at an end of thereof, and the groove starts with an arc corresponding to the holding piece 40 and gradually decreases toward the coupling portion 20. The grooves 31 are configured to receive an upper end of the fixture 50 when the holding pieces 40 hold the upper end of the fixture 50.

Referring back to FIGS. 5 and 6, the threaded portion 51 has a quadrangular thread, and an upper surface and an inner surface of the holding piece 40 define a cross section formed with a right angle. The holding piece 40 has a thickness t smaller than an interval G of the thread 52 of the threaded portion 50. Therefore, when the holding pieces 40 hold the threaded portion 50 of the fixture 50, the holding pieces 40 are inserted into the interval G and the trough 53 of the thread 52, thereby securely holding the fixture 50.

The holding piece 40 protrudes to have a width W larger than a height H of the thread 52. Therefore, when the holding pieces 40 hold the threaded portion 51 of the fixture 50, the holding pieces 40 are inserted into the interval G and the trough 53 of the thread 52, thereby securely supporting a lower portion of the thread 52 (based on FIG. 5).

As described above, in the first exemplary embodiment, the holding pieces 40 support the lower portion of the thread 52 while holding the trough 53 of the threaded portion 51, thereby effectively applying, to the fixture 50, the force for removing the fixture 50. Therefore, it is possible to prevent the holding pieces 40 from slipping out of the fixture 50 at the time of removing the fixture 50.

Hereinafter, various exemplary embodiments of the present invention will be described. The descriptions of the components identical to the components described in the first exemplary embodiment and the above-mentioned exemplary embodiments will be omitted, and components different from the components described in the first exemplary embodiment and the above-mentioned exemplary embodiments will be described.

Figure 7:
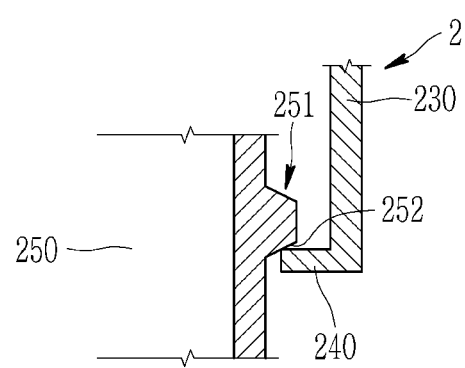
FIG. 7 is an enlarged cross-sectional view illustrating a state in which a holding piece is in contact with a trapezoidal thread of a fixture in a state in which the fixture is held by a holding piece of forceps for removing a dental implant fixture according to a second exemplary embodiment of the present invention.

FIG. 7 is an enlarged cross-sectional view illustrating a state in which a holding piece is in contact with a trapezoidal thread of a fixture in a state in which the fixture is held by a holding piece of forceps for removing a dental implant fixture according to a second exemplary embodiment of the present invention.

Referring to FIG. 7, in the case of forceps 2 for removing a fixture according to a second exemplary embodiment, holding pieces 240 of pinching portions 230 hold a fixture 250. A threaded portion 251 of the fixture 250 has a trapezoidal thread, and an upper surface and an inner surface of the holding piece 40 have a cross section formed with a right angle. The holding pieces 240 come into contact with the trapezoidal thread 252.

As described above, in the second exemplary embodiment, the holding pieces 240 support a lower portion of the thread 252 while holding the trapezoidal thread 252, thereby effectively applying, to the fixture 250, the force for removing the fixture 250.

Therefore, it is possible to prevent the holding pieces 240 from slipping out of the fixture 250 at the time of removing the fixture 250. In addition, the holding pieces 240 further apply the force to the fixture 250 in a direction (upward direction based on FIG. 7) in which the force assists in removing the fixture 250.

Figure 8:
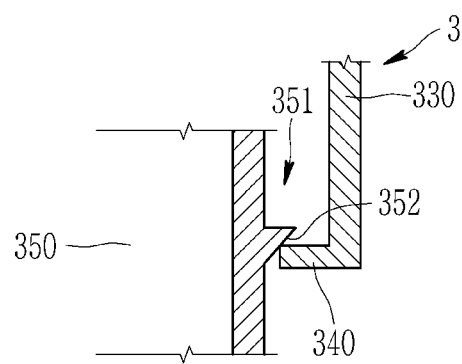
FIG. 8 is an enlarged cross-sectional view illustrating a state in which a holding piece is in contact with a serrated thread of a fixture in a state in which the fixture is held by a holding piece of forceps for removing a dental implant fixture according to a third exemplary embodiment of the present invention.

FIG. 8 is an enlarged cross-sectional view illustrating a state in which a holding piece is in contact with a serrated thread of a fixture in a state in which the fixture is held by a holding piece of forceps for removing a dental implant fixture according to a third exemplary embodiment of the present invention.

Referring to FIG. 8, in the case of forceps 3 for removing a fixture according to a third exemplary embodiment, holding pieces 340 of pinching portions 330 hold a fixture 350. A threaded portion 351 of the fixture 350 has a serrated thread, and an upper surface and an inner surface of the holding piece 340 have a cross section formed with a right angle. The holding pieces 340 come into contact with the serrated thread 352.

As described above, in the third exemplary embodiment, the holding pieces 340 support a lower portion of the thread 352 while holding the serrated thread 352, thereby effectively applying, to the fixture 350, the force for removing the fixture 350.

Therefore, it is possible to prevent the holding pieces 340 from slipping out of the fixture 350 at the time of removing the fixture 350. In addition, the holding pieces 340 further apply force to the fixture 350 in a direction (upward direction based on FIG. 8) in which the force assists in removing the fixture 350.

Referring back to FIGS. 3 and 6, in the forceps 1, 2, and 3 for removing a fixture according to the first to third exemplary embodiments, the pinching portion 30 of each of the holding pieces 40, 240, and 340 has one arc. Each of the holding pieces 40, 240, and 340 shaped like an arc may securely hold each of the threaded portions 51, 251, and 351 formed circumferentially on the outer circumference of each of the fixtures 50, 250, and 350.

Figure 9:
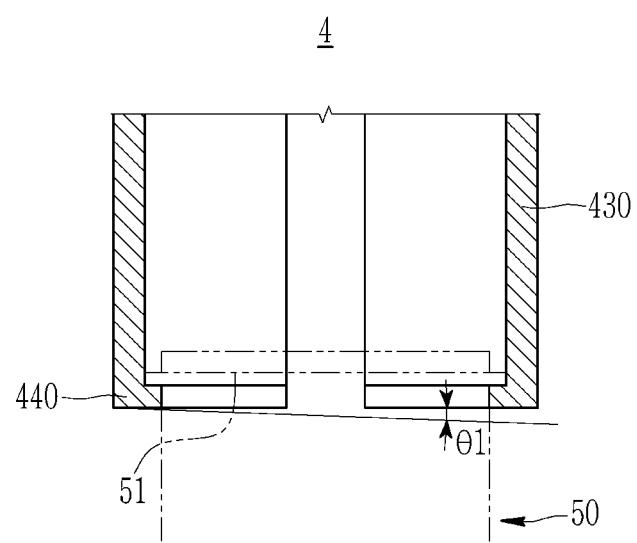
FIG. 9 is a partial cross-sectional view illustrating a state in which a fixture is held by a holding piece of forceps for removing a dental implant fixture according to a fourth exemplary embodiment of the present invention.

FIG. 9 is a partial cross-sectional view illustrating a state in which a fixture is held by a holding piece of forceps for removing a dental implant fixture according to a fourth exemplary embodiment of the present invention.

Referring to FIG. 9, in the case of forceps 4 for removing a fixture according to a fourth exemplary embodiment, each holding piece 440 of each pinching portion 430 has an inclination angle θ1 set in a diameter direction of the fixture 50 so as to correspond to an inclination of the threaded portion 51.

The holding piece 440 having the inclination angle θ1 corresponds to the inclination of the threaded portion 51, thereby more securely holding the threaded portion 51 formed to be inclined circumferentially on the outer circumference of the fixture 50.

Figure 10:
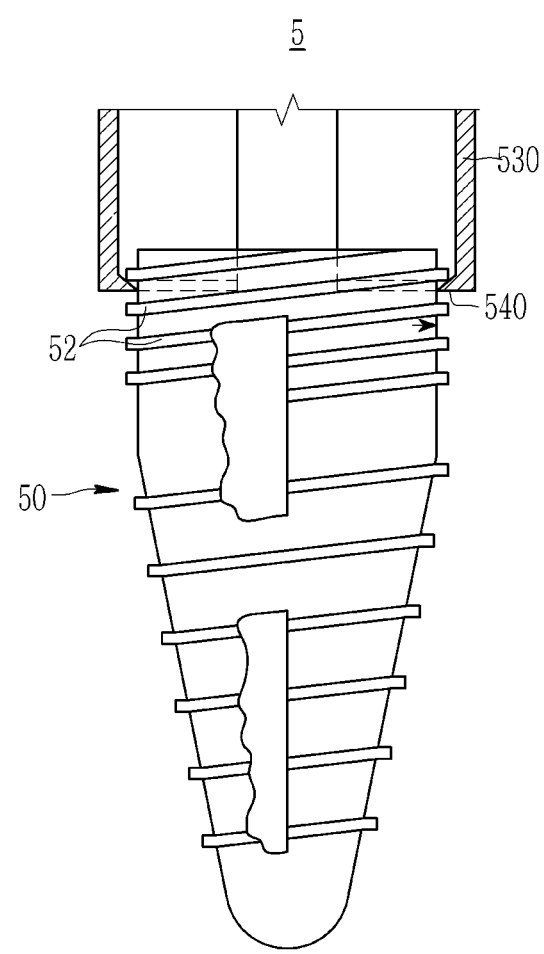
FIG. 10 is a partial cross-sectional view illustrating a state in which a fixture is held by a holding piece of the forceps for removing a dental implant fixture according to a fifth exemplary embodiment of the present invention.
Figure 11:
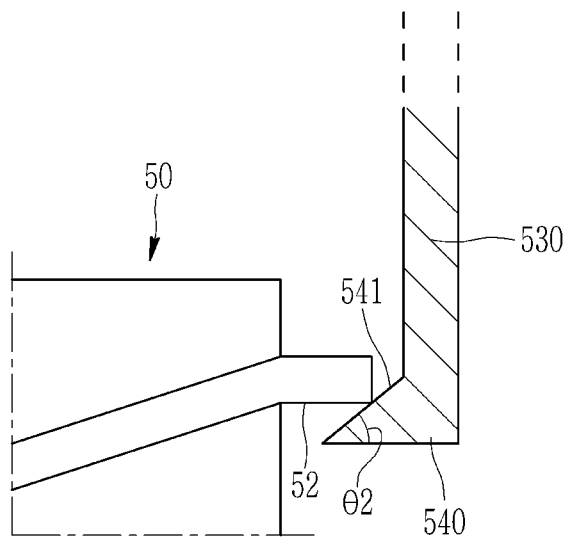
FIG. 11 is an enlarged cross-sectional view illustrating a state in which the holding piece is in contact with a thread of the fixture in FIG. 10.

FIG. 10 is a partial cross-sectional view illustrating a state in which a fixture is held by a holding piece of forceps for removing a dental implant fixture according to a fifth exemplary embodiment of the present invention, and FIG. 11 is an enlarged cross-sectional view illustrating a state in which the holding piece is in contact with a thread of the fixture in FIG. 10.

Referring to FIGS. 10 and 11, in the case of forceps 5 for removing a fixture according to a fifth exemplary embodiment, each holding piece 540 of each pinching portion 530 has an inclined surface 541 having an inclination angle θ2 set in the diameter direction of the fixture 50.

As described above, in the fifth exemplary embodiment, the inclined surfaces 541 of the holding pieces 540 support the lower portion of the quadrangular thread 52 while holding the thread 52, thereby effectively applying, to the fixture 50, the force for removing the fixture 50.

Therefore, it is possible to prevent the holding pieces 540 from slipping out of the fixture 50 at the time of removing the fixture 50. In addition, the inclined surfaces 541 of the holding pieces 540 further apply force to the fixture 50 in a direction (upward direction based on FIGS. 10 and 11) in which the force assists in removing the fixture 50.

Figure 12:
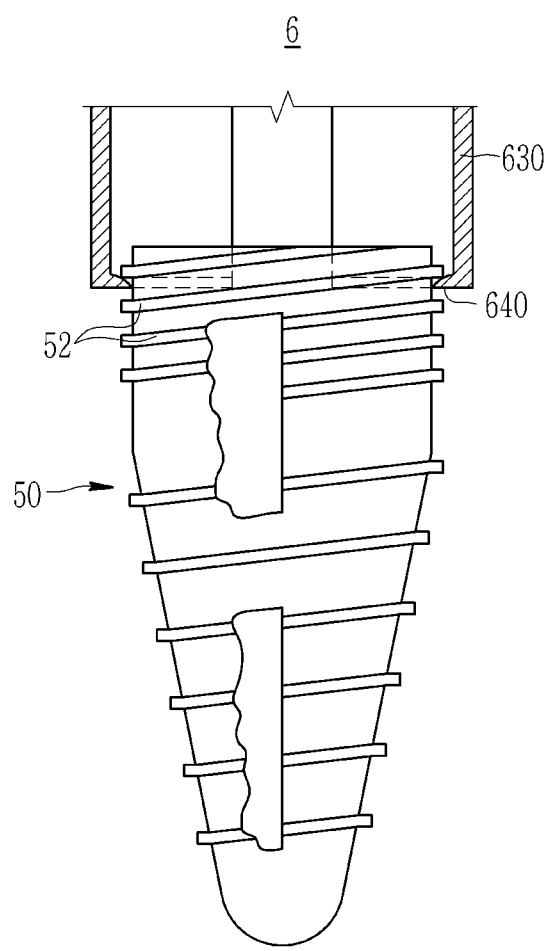
FIG. 12 is a partial cross-sectional view illustrating a state in which a fixture is held by a holding piece of the forceps for removing a dental implant fixture according to a sixth exemplary embodiment of the present invention.
Figure 13:
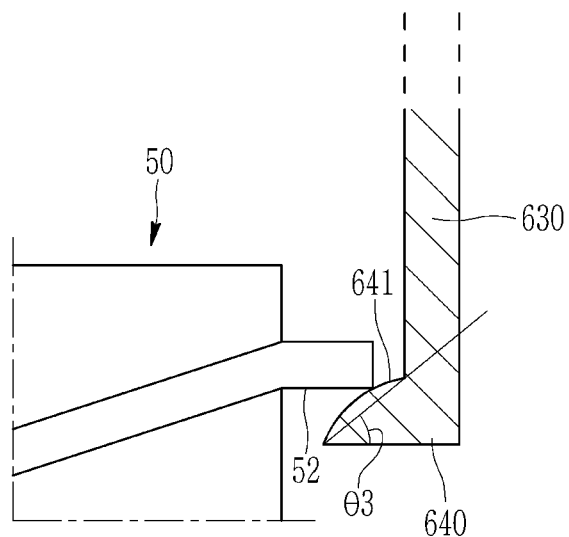
FIG. 13 is an enlarged cross-sectional view illustrating a state in which the holding piece is in contact with a thread of the fixture in FIG. 12.

FIG. 12 is a partial cross-sectional view illustrating a state in which a fixture is held by a holding piece of forceps for removing a dental implant fixture according to a sixth exemplary embodiment of the present invention, and FIG. 13 is an enlarged cross-sectional view illustrating a state in which the holding piece is in contact with a thread of the fixture in FIG. 12.

Referring to FIGS. 12 and 13, in the case of forceps 6 for removing a fixture according to a sixth exemplary embodiment, each holding piece 640 of each pinching portion 630 has an inclination angle θ3 and an upwardly convex inclined surface 641 which are set in the diameter direction of the fixture 50.

As described above, in the sixth exemplary embodiment, the inclined surfaces 641 of the holding pieces 640 support the lower portion of the quadrangular thread 52 while holding the thread 52, thereby effectively applying, to the fixture 50, the force for removing the fixture 50.

Therefore, it is possible to prevent the holding pieces 640 from slipping out of the fixture 50 at the time of removing the fixture 50. In addition, the inclination angle θ3 and the upwardly convex inclined surfaces 641 of the holding pieces 640 further apply the force to the fixture 50 in a direction (upward direction based on FIGS. 12 and 13) in which the force assists in removing the fixture 50.

Figure 14:
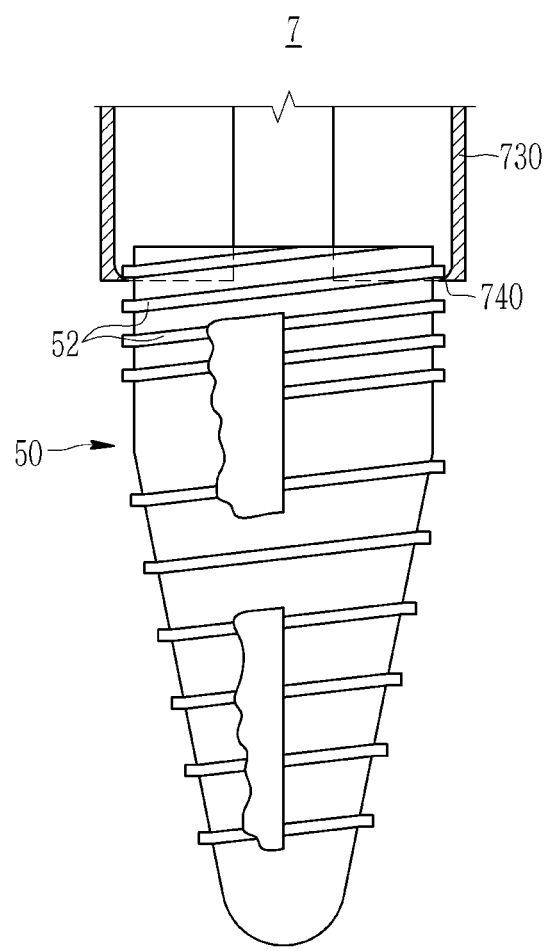
FIG. 14 is a partial cross-sectional view illustrating a state in which a fixture is held by a holding piece of forceps for removing a dental implant fixture according to a seventh exemplary embodiment of the present invention.
Figure 15:
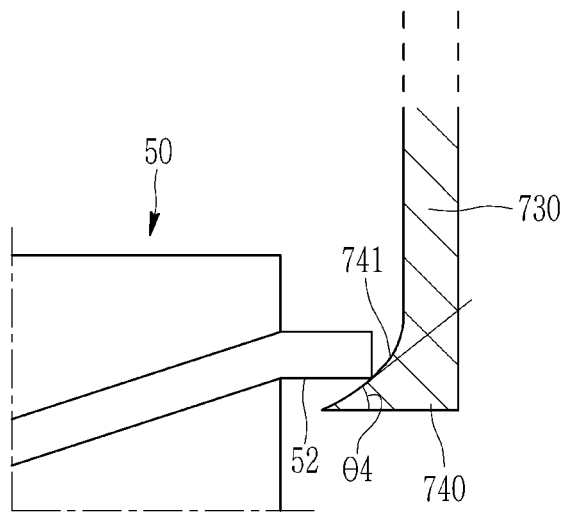
FIG. 15 is a cross-sectional enlarged view illustrating a state in which the holding piece is in contact with a thread of the fixture in FIG. 14.

FIG. 14 is a partial cross-sectional view illustrating a state in which a fixture is held by a holding piece of forceps for removing a dental implant fixture according to a seventh exemplary embodiment of the present invention, and FIG. 15 is an enlarged cross-sectional view illustrating a state in which the holding piece is in contact with a thread of the fixture in FIG. 14.

Referring to FIGS. 14 and 15, in the case of forceps 7 for removing a fixture according to a seventh exemplary embodiment, each holding piece 740 of each pinching portion 730 has an inclination angle θ4 and an upwardly concave inclined surface 741 set in the diameter direction of the fixture 50.

As described above, in the seventh exemplary embodiment, the inclined surfaces 741 of the holding pieces 740 support the lower portion of the quadrangular thread 52 while holding the thread 52, thereby effectively applying, to the fixture 50, the force for removing the fixture 50.

Therefore, it is possible to prevent the holding pieces 740 from slipping out of the fixture 50 at the time of removing the fixture 50. In addition, the inclination angle θ4 and the upwardly concave inclined surfaces 741 of the holding piece 740 further apply force to the fixture 50 in a direction (upward direction based on FIGS. 14 and 15) in which the force assists in removing the fixture 50.

Figure 16:
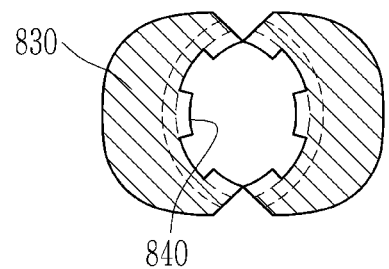
FIG. 16 is a bottom plan view illustrating a holding piece of forceps for removing a dental implant fixture according to an eighth exemplary embodiment of the present invention.
Figure 17:
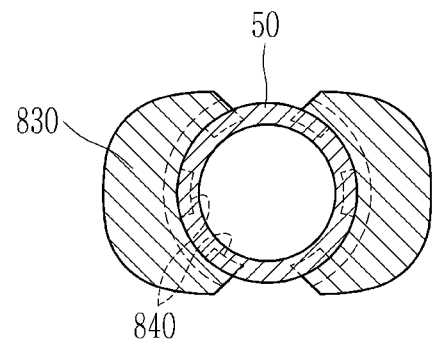
FIG. 17 is a partial cross-sectional view illustrating a state in which a fixture is held by the holding piece of the forceps for removing a dental implant fixture in FIG. 16.

FIG. 16 is a bottom plan view illustrating a holding piece of forceps for removing a dental implant fixture according to an eighth exemplary embodiment of the present invention, and FIG. 17 is a partial cross-sectional view illustrating a state in which a fixture is held by the holding piece of the forceps for removing a dental implant fixture in FIG. 16.

Referring to FIGS. 16 and 17, in the case of forceps 8 for removing a fixture according to an eighth exemplary embodiment, each pinching portion 830 has multiple holding pieces 840 such that the holding pieces 840 of the pinching portion 830 are disposed along an imaginary arc.

The multiple holding pieces 840 formed along the imaginary arc protrude from the ends of the pinching portions 830 in the direction toward the center of the dental implant fixture 50, so that when the multiple holding pieces 840 are inserted into the trough of the threaded portion formed on the outer circumference of the fixture 50 implanted in the alveolar bone, thereby holding the fixture 50, the multiple holding pieces 840 may be more easily inserted into the trough and may hold the fixture 50 in comparison with the holding piece 40 according to the first exemplary embodiment which defines an arc as a whole.

Figure 18:
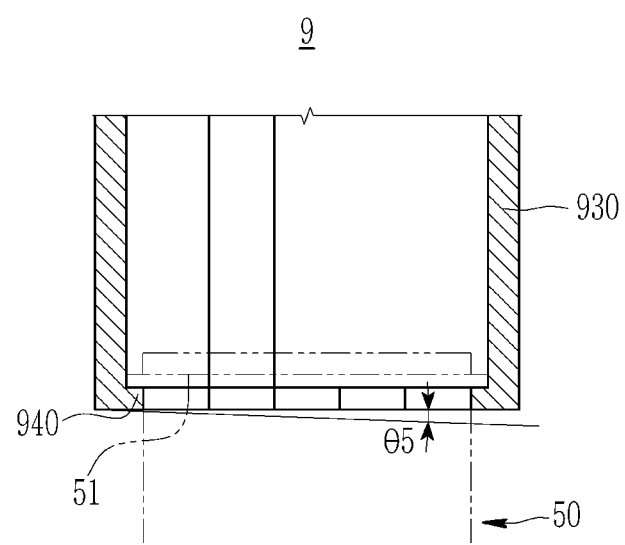
FIG. 18 is a partial cross-sectional view illustrating a state in which a fixture is held by a holding piece of forceps for removing a dental implant fixture according to a ninth exemplary embodiment of the present invention.

FIG. 18 is a partial cross-sectional view illustrating a state in which a fixture is held by a holding piece of forceps for removing a dental implant fixture according to a ninth exemplary embodiment of the present invention.

Referring to FIG. 18, in the case of forceps 9 for removing a fixture according to a ninth exemplary embodiment, each holding piece 940 of each pinching portion 930 has an inclination angle θ5 set in the diameter direction of the fixture 50 so as to correspond to the inclination of the threaded portion 51.

The holding piece 940 having the inclination angle θ5 corresponds to the inclination of the threaded portion 51, thereby more securely holding the threaded portion 51 *d* formed to be inclined circumferentially on the outer circumference of the fixture 50. That is, it is possible to effectively prevent the holding pieces 940 from slipping out of the fixture 50 at the time of removing the fixture 50.

While the exemplary embodiments of the present invention have been described above, the present invention is not limited thereto, and various modifications can be made and carried out within the scope of the claims, the detailed description of the invention, and the accompanying drawings, and also fall within the scope of the invention.

DESCRIPTION OF SYMBOLS

| | |
|---|---|
| 1, 2, 4, 5, 6, 7, 8, 9: | Forceps for removing fixture |
| 10: | Handle |
| 11: | Knurled portion |
| 20: | Coupling portion |
| 21: | Hinge |
| 30, 230, 330, 430, 530, 630, 730, 830, 930: | Pinching portion |
| 31: | Groove |
| 40, 240, 340, 440, 540, 640, 740, 840, 940: | Holding piece |
| 50, 250, 350: | Fixture |
| 51, 251, 351: | Threaded portion |
| 52, 252, 352: | Thread |
| 53: | Trough |
| 60: | Alveolar bone |
| 541, 641, 741: | Inclined surface |
| G: | Interval |
| H: | Height |
| t: | Thickness |
| W: | Width |
| θ1, θ2, θ3, θ4, θ5: | Inclination angle |
| θn: | Neck angle |

What is claimed is:

1. Forceps for removing dental implant fixture, the forceps comprising:
a pair of handles;
coupling portions extended from the handles, crossed, and hingedly coupled;
pinching portions connected to the coupling portions; and
holding pieces protruding from ends of the pinching portions in a direction adapted to be toward a center of a dental implant fixture and each having an arc corresponding to at least a part of an outer circumference of the fixture so that the holding pieces are capable of being inserted into a trough of a threaded portion formed on the outer circumference of the fixture,
wherein:
each of the pinching portions has a groove at an end thereof, the groove has an arc corresponding to each of the holding pieces at a location where the each of the holding pieces is protruded, a depth of the groove gradually decreases toward a coupling portion, and the groove is adapted to receive an upper end of the fixture.

2. The forceps of claim 1, wherein:
each of the holding pieces has a thickness t smaller than a thread interval of the threaded portion.

3. The forceps of claim 2, wherein:
the each of the holding pieces protrudes to have a width W larger than a height H of a thread.

4. The forceps of claim 2, wherein:
the threaded portion has a quadrangular thread, a trapezoidal thread, or a serrated thread, and an upper surface and an inner surface of the each of the holding pieces have a cross section formed with a right angle.

5. The forceps of claim 2, wherein:
each of the pinching portions has one of the holding pieces that defines an arc.

6. The forceps of claim 2, wherein:
a holding piece has an inclination angle $\theta 1$ set in a diameter direction of the fixture so as to correspond to an inclination of the threaded portion.

7. The forceps of claim 2, wherein:
a holding piece has an inclined surface having an inclination angle $\theta 2$ set in a diameter direction of the fixture.

8. The forceps of claim 2, wherein:
a holding piece has an inclination angle $\theta 3$ and an upwardly convex inclined surface set in a diameter direction of the fixture.

9. The forceps of claim 2, wherein:
a holding piece has an inclination angle $\theta 4$ and an upwardly concave inclined surface set in a diameter direction of the fixture.

10. The forceps of claim 2, wherein:
each of the pinching portions has multiple holding pieces disposed along an imaginary arc.

11. The forceps of claim 10, wherein:
each of the multiple holding pieces has an inclination angle $\theta 5$ set in a diameter direction of the fixture so as to correspond to an inclination of the threaded portion.

* * * * *